US009866725B2

(12) United States Patent
Sakawaki

(10) Patent No.: US 9,866,725 B2
(45) Date of Patent: Jan. 9, 2018

(54) IMAGE PROCESSING SYSTEM, INFORMATION PROCESSING APPARATUS, AND RECORDABLE MEDIUM

(71) Applicant: Yoshihiko Sakawaki, Kanagawa (JP)

(72) Inventor: Yoshihiko Sakawaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/335,593

(22) Filed: Oct. 27, 2016

(65) Prior Publication Data

US 2017/0048412 A1    Feb. 16, 2017

Related U.S. Application Data

(63) Continuation of application No. 14/541,308, filed on Nov. 14, 2014, now Pat. No. 9,519,829.

(30) Foreign Application Priority Data

Nov. 28, 2013   (JP) ................. 2013-246271
Jun. 4, 2014    (JP) ................. 2014-116170

(51) Int. Cl.
*G06K 9/18*     (2006.01)
*H04N 1/32*     (2006.01)
(Continued)

(52) U.S. Cl.
CPC ....... *H04N 1/3248* (2013.01); *G06K 9/00442* (2013.01); *G06K 9/00483* (2013.01);
(Continued)

(58) Field of Classification Search
CPC .. H04N 1/00; H04N 1/00204; H04N 1/00331; H04N 1/00456; H04N 1/00464;
(Continued)

(56) References Cited

U.S. PATENT DOCUMENTS 5,460,273 A   10/1995  Stevens
6,038,553 A    3/2000  Hyde, Jr.
(Continued)

FOREIGN PATENT DOCUMENTS

CN       1716234 A    1/2006
CN     102393847 A    3/2012
(Continued)

OTHER PUBLICATIONS

Combined Chinese Office Action and Search Report dated Apr. 1, 2017, in Patent Application No. 201410697093.8 (with English translation).

*Primary Examiner* — Jose Couso
(74) *Attorney, Agent, or Firm* — Oblon, McClelland, Maier & Neustadt, L.L.P.

(57) ABSTRACT

An image processing system comprises a generating unit that reads documents and generates a read image including document images; an extracting unit that extracts each of the document images; a character recognizing unit that performs character recognition processing on each the document images; a determining unit that determines whether first information and second information have a pair relationship, the first information being any one of recognition results obtained on one side of the document images, and the second information being any one of recognition results obtained on the other side of the document images; and a registering unit that registers pieces of information for the recognition results corresponding to the one side and to the other side respectively including the first information and the second information which are determined that both pieces of information have the pair relationship, as information for a piece of the documents, in a storage unit.

10 Claims, 9 Drawing Sheets

(51) Int. Cl.
*G06K 9/00* (2006.01)
*H04N 1/00* (2006.01)

(52) U.S. Cl.
CPC ..... *H04N 1/00801* (2013.01); *H04N 1/00816* (2013.01); *G06K 2209/01* (2013.01); *H04N 2201/0094* (2013.01); *H04N 2201/3247* (2013.01)

(58) Field of Classification Search
CPC ........... H04N 1/00482; H04N 1/00801; H04N 1/00816; H04N 1/00973; H04N 1/3248; H04N 1/3873; H04N 1/3875; H04N 2201/001; H04N 2201/0094; H04N 2201/3247; H04N 1/387; H04N 1/04; H04N 1/3876; G06K 9/00442; G06K 9/00483; G06K 2209/01; G06F 17/22; B07C 1/00; B07C 3/02; G03G 15/36
See application file for complete search history.

(56) References Cited

U.S. PATENT DOCUMENTS

| | | | |
|---|---|---|---|
| 8,184,908 B2 | 5/2012 | Okochi | |
| 8,508,811 B2* | 8/2013 | Safonov | H04N 1/00413 235/451 |
| 8,724,189 B2* | 5/2014 | Safonov | H04N 1/00413 358/450 |
| 2013/0219261 A1 | 8/2013 | Han et al. | |

FOREIGN PATENT DOCUMENTS

| | | |
|---|---|---|
| JP | 01-248287 | 10/1989 |
| JP | 2002-044303 | 2/2002 |
| JP | 2002-062765 | 2/2002 |
| JP | 2002-200826 | 7/2002 |
| JP | 2003-274084 | 9/2003 |
| JP | 2003-296353 | 10/2003 |
| JP | 2006-339770 A | 12/2006 |
| JP | 2007-183754 | 7/2007 |
| JP | 4359721 | 8/2009 |
| JP | 4795038 | 8/2011 |
| JP | 2013-168113 | 8/2013 |

* cited by examiner

IMAGE PROCESSING SYSTEM, INFORMATION PROCESSING APPARATUS, AND RECORDABLE MEDIUM

CROSS-REFERENCE TO RELATED APPLICATIONS

The present application is a continuation of application Ser. No. 14/541,308, filed Nov. 14, 2014, and claims priority to Japanese Patent Application No. 2013-246271, filed in Japan on Nov. 28, 2013 and Japanese Patent Application No. 2014-116170, filed in Japan on Jun. 4, 2014, the contents of each of which are incorporated by reference in their entirety.

BACKGROUND OF THE INVENTION

1. Field of the Invention

The present invention relates to an image processing system, an information processing apparatus, and a computer-readable recording medium having a computer program.

2. Description of the Related Art

Conventionally, a technology is known in which both sides of a document such as a business card having a pair relationship between a front face and a rear face thereof are scanned by a scanner, characters included in scanned data are recognized by an optical character reader (OCR) function, and pieces of information for the front face and the rear face are compiled into a database in association with each other. For example, in the technology, a plurality of business cards held in a transparent sheet are scanned and recognized by the OCR function. In other words, based on an assumption that the business cards held in the transparent sheet are scanned and scanned positions between the corresponding front face and rear face are thereby previously known, pieces of information for the front face and the rear face are associated with each other to be complied into a database.

However, the conventional technology requires users to do work, when documents such as business cards are to be compiled into a database, such as preparing of a transparent sheet for holding business cards therein and putting of business cards, which are desired to be compiled into a database, into the transparent sheet, and therefore the work is inconvenient for users. Recently, business cards have various shapes and sizes, the user has to prepare transparent sheets suitable for various business cards and put the business cards into the transparent sheets. Therefore, occasions inconvenient for users increasingly occur.

In view of the above-mentioned conventional problems, there is a need to provide an image processing system, an information processing apparatus, and a computer-readable recording medium having a computer program capable of improving user friendliness.

SUMMARY OF THE INVENTION

It is an object of the present invention to at least partially solve the problems in the conventional technology.

According to the present invention, there is provided an image processing system comprising: a generating unit that reads a plurality of documents and generates a read image including a plurality of document images; an extracting unit that extracts each of the document images included in the generated read image; a character recognizing unit that performs character recognition processing on each of the extracted document images; a determining unit that determines whether or not first information and second information have a pair relationship, the first information being any one of a plurality of recognition results obtained by performing the character recognition processing on one side of the document images, and the second information being any one of a plurality of recognition results obtained by performing the character recognition processing on the other side of the document images; and a registering unit that registers pieces of information for the recognition results corresponding to the one side and to the other side respectively including the first information and the second information which are determined that both pieces of information have the pair relationship, as information for a piece of the documents, in a storage unit.

The present invention also provides an information processing apparatus comprising: an extracting unit that extracts each of document images included in a read image generated after a plurality of documents are read; a character recognizing unit that performs character recognition processing on each of the extracted document images; a determining unit that determines whether or not first information and second information have a pair relationship, the first information being any one of a plurality of recognition results obtained by performing the character recognition processing on one side of the document images, and second information being any one of a plurality of recognition results obtained by performing the character recognition processing on the other side of the document images; and a registering unit that registers pieces of information for the recognition results corresponding to the one side and to the other side respectively including the first information and the second information which are determined that both pieces of information have the pair relationship, as information for a piece of the documents, in a storage unit.

The present invention also provides a non-transitory computer-readable recording medium that contains programmed instructions, the instruction causing a computer to execute: extracting each of document images included in a read image generated after a plurality of documents are read; performing character recognition processing on each of the extracted document images; determining whether or not first information and second information have a pair relationship, the first information being any one of a plurality of recognition results obtained by performing the character recognition processing on one side of the document images, and second information being any one of a plurality of recognition results obtained by performing the character recognition processing on the other side of the document images; and registering pieces of information for the recognition results corresponding to the one side and to the other side respectively including the first information and the second information which are determined that both pieces of information have the pair relationship, as information for a piece of the documents, in a storage unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the image processing system, the information processing apparatus, and the computer-readable recording medium according to the present invention will be explained below with reference to the accompanying drawings. It should be noted that the present invention is not limited by the following embodiments. In addition, the embodiments can be combined as appropriate within a range in which any combination does not contradict their contents.

First Embodiment

System Configuration

Figure 1:
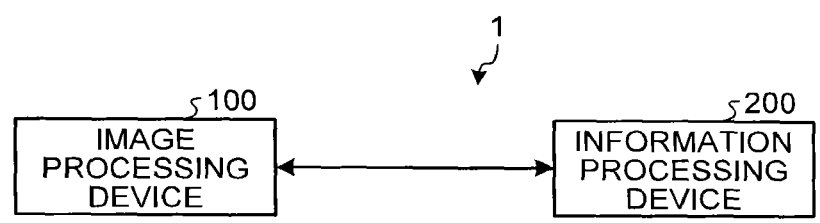
FIG. 1 is a diagram illustrating a configuration example of an image processing system according to a first embodiment of the present invention, the image processing system including an information processing apparatus and an image processing apparatus.

A configuration of an image processing system according to a first embodiment of the present invention will be explained below with reference to FIG. 1. FIG. 1 is a diagram illustrating a configuration example of the image processing system according to the first embodiment.

As illustrated in FIG. 1, an image processing system 1 includes an image processing apparatus 100 and an information processing apparatus 200. The image processing apparatus 100 and the information processing apparatus 200 are connected to a network such as the Internet and can thereby communicate with each other. The network may be connected with a plurality of the image processing apparatuses 100.

In the configuration, the image processing apparatus 100 scans a plurality of documents at a time, generates a scanned image including a plurality of document images, and transmits the generated scanned image to the information processing apparatus 200. The image processing apparatus 100 may be a scanner device having a scanner function, or may be a multifunction peripheral that has two or more functions including at least a scanner function among a copy function, a printer function, the scanner function, and a facsimile function. The present embodiment exemplifies a case where the image processing apparatus 100 is a multifunction peripheral.

The information processing apparatus 200 receives the scanned image including the document images transmitted by the image processing apparatus 100, and extracts each of the document images included in the scanned image. The information processing apparatus 200 then performs the OCR processing on each of the extracted document images. The information processing apparatus 200 determines whether or not elements in arrays on one side and the other side of the respective document images obtained by performing the OCR processing thereon have a pair relationship. When it is determined that the elements have a pair relationship, the information processing apparatus 200 registers pieces of information on the one side and on the other side as information for one document in a storage unit. The information processing apparatus 200 is an information processing apparatus such as a personal computer (PC) or a server device.

In other words, in the present embodiment, when documents are scanned at a time, pieces of information on one side and on the other side of each of the documents are associated with each other to be compiled into a database without using a transparent sheet, thus improving user's operational flexibility.

Hardware Configuration

Figure 2:
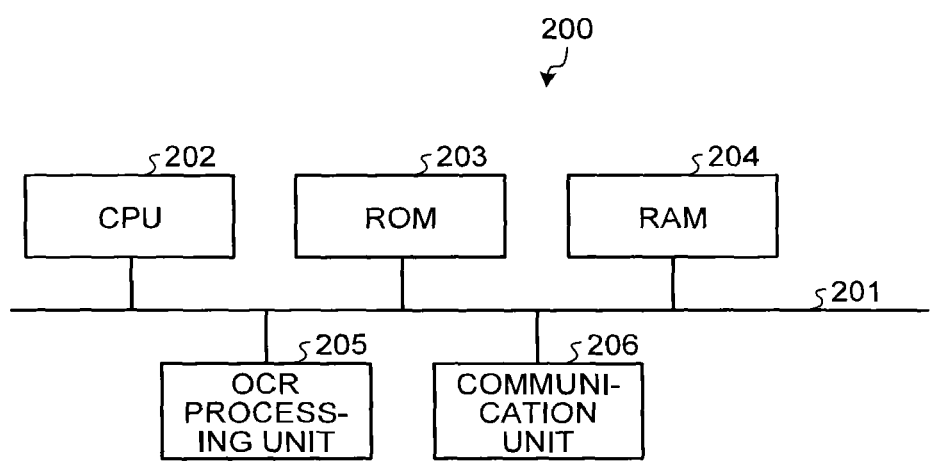
FIG. 2 is a diagram illustrating a hardware configuration example of the information processing apparatus according to the first embodiment.

A hardware configuration of the information processing apparatus 200 according to the first embodiment will be explained next with reference to FIG. 2. FIG. 2 is a diagram illustrating a hardware configuration example of the information processing apparatus 200 according to the first embodiment.

As illustrated in FIG. 2, the information processing apparatus 200 includes a central processing unit (CPU) 202, a read only memory (ROM) 203, a random access memory (RAM) 204, an OCR processing unit 205, and a communication unit 206, which are connected to each other via a bus 201.

Among the units, the CPU 202 controls the entire information processing apparatus 200. The ROM 203 stores programs and various data used for processing performed by the control of the CPU 202. The RAM 204 temporarily stores data or the like used for processing performed by the control of the CPU 202. The OCR processing unit 205 performs character recognition processing (OCR processing) for recognizing a character included in image data. The communication unit 206 performs communication with the image processing apparatus 100 via the network.

Figure 3:
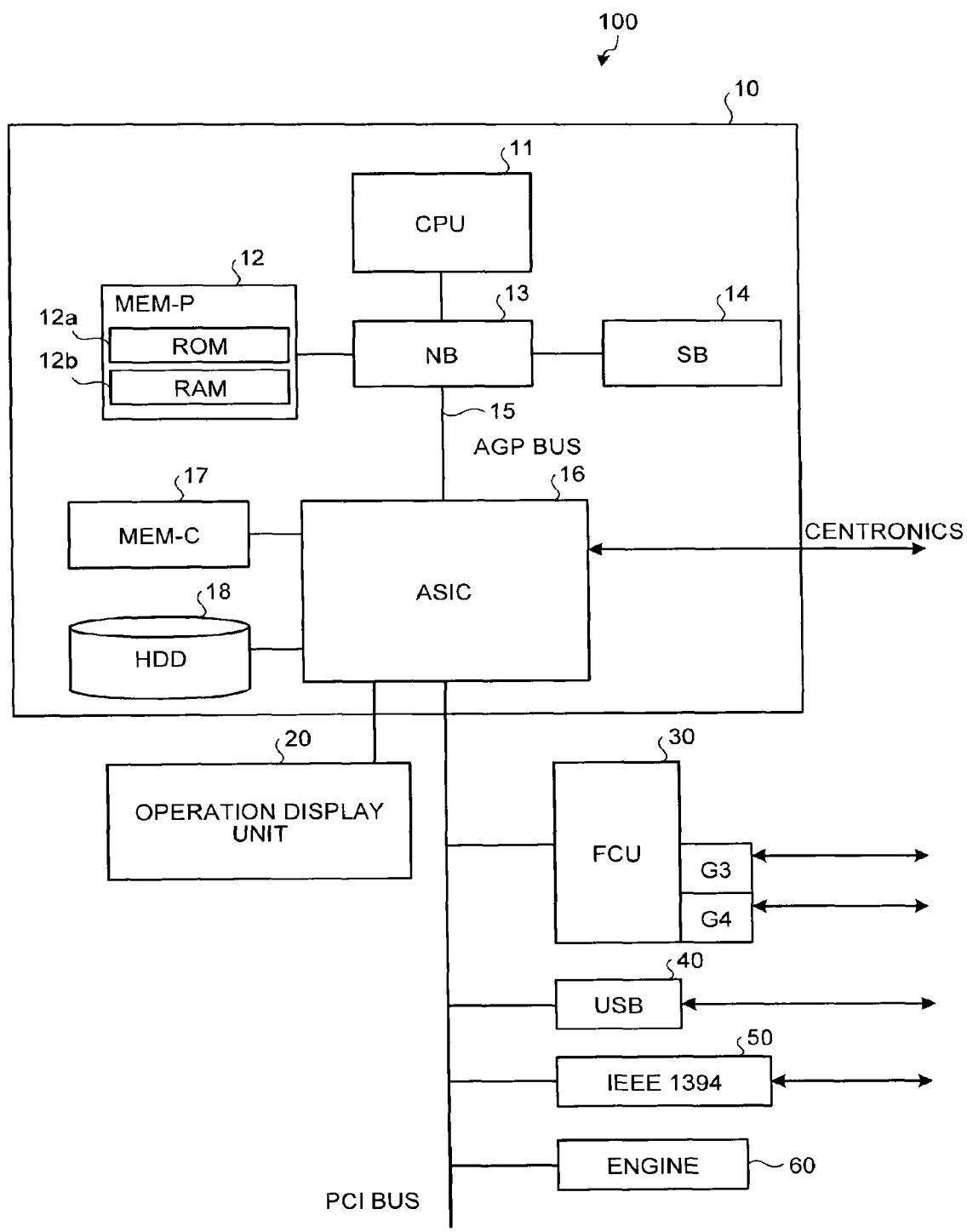
FIG. 3 is a diagram illustrating a hardware configuration example of the image processing apparatus according to the first embodiment.

A hardware configuration of the image processing apparatus 100 according to the first embodiment will be explained next with respect to FIG. 3. FIG. 3 is a diagram illustrating a hardware configuration example of the image processing apparatus 100 according to the first embodiment.

As illustrated in FIG. 3, the image processing apparatus 100 is configured to connect a controller 10 and an engine unit (Engine) 60 via a Peripheral Component Interface (PCI) bus. The controller 10 controls the entire image processing apparatus 100, and also controls drawing, communications, and an input from an operating unit (not illustrated). The Engine 60 is a printer engine or the like that can be connected to the PCI bus, such as a black/white plotter, a 1-drum color plotter, a 4-drum color plotter, a scanner, or a facsimile unit. The Engine 60 includes an image processing portion, such as error diffusion or gamma conversion, in addition to a so-called engine portion such as a plotter.

The controller 10 includes a CPU 11, a north bridge (NB) 13, a system memory (MEM-P) 12, a south bridge (SB) 14, a local memory (MEM-C) 17, an application specific integrated circuit (ASIC) 16, and a hard disk drive (HDD) 18, in which an Accelerated Graphics Port (AGP) bus 15 is used to connect the NB 13 and the ASIC 16. The MEM-P 12 further includes a ROM 12a and a RAM 12b.

The CPU 11 controls the entire image processing apparatus 100, has a chipset including the NB 13, the MEM-P 12, and the SB 14, and is connected to other devices via the chipset.

The NB 13 is a bridge for connecting the CPU 11 with the MEM-P 12, the SB 14, and the AGP bus 15. The NB 13 includes a memory controller that controls writing/reading to/from the MEM-P 12, a PCI master, and an AGP target.

The MEM-P 12 is a system memory used as a memory for storing programs and data, a memory for loading programs and data, a drawing memory for a printer, and the like. The MEM-P 12 includes the ROM 12a and the RAM 12b. The ROM 12a is a read only memory used as the memory for storing programs and data, and the RAM 12b is a writable/readable memory used as the memory for loading programs and data and as the drawing memory for a printer.

The SB 14 is a bridge that connects the NB 13 to the PCI device and peripheral devices. The SB 14 is connected with the NB 13 via the PCI bus. The PCI bus is also connected with a network interface (I/F) and the like.

The ASIC 16 is an integrated circuit (IC) for image processing that has a hardware element for image processing. The ASIC 16 functions as a bridge that connects the AGP bus 15, the PCI bus, the HDD 18, and the MEM-C 17 to each other. The ASIC 16 is connected with a facsimile control unit (FCU) 30, a universal serial bus (USB) 40, the Institute of Electrical and Electronics Engineers 1394 (IEEE 1394) interface 50 via the PCI bus between a PCI target, an AGP master, an arbiter (ARB) which is the core of the ASIC 16, a memory controller that controls the MEM-C 17, a plurality of direct memory access controllers (DMACs) that rotate image data by hardware logic or the like, and the Engine 60. An operation display unit 20 is directly connected to the ASIC 16.

The MEM-C 17 is a local memory used as a copying image buffer or a code buffer. The HDD 18 is a storage for accumulation of image data, accumulation of programs, accumulation of font data, and accumulation of forms.

The AGP bus 15 is a bus interface for a graphics accelerator card proposed to speed up graphics processing. The AGP bus 15 increases the speed of the graphics accelerator card by directly accessing the MEM-P 12 at a high throughput.

Figure 4:
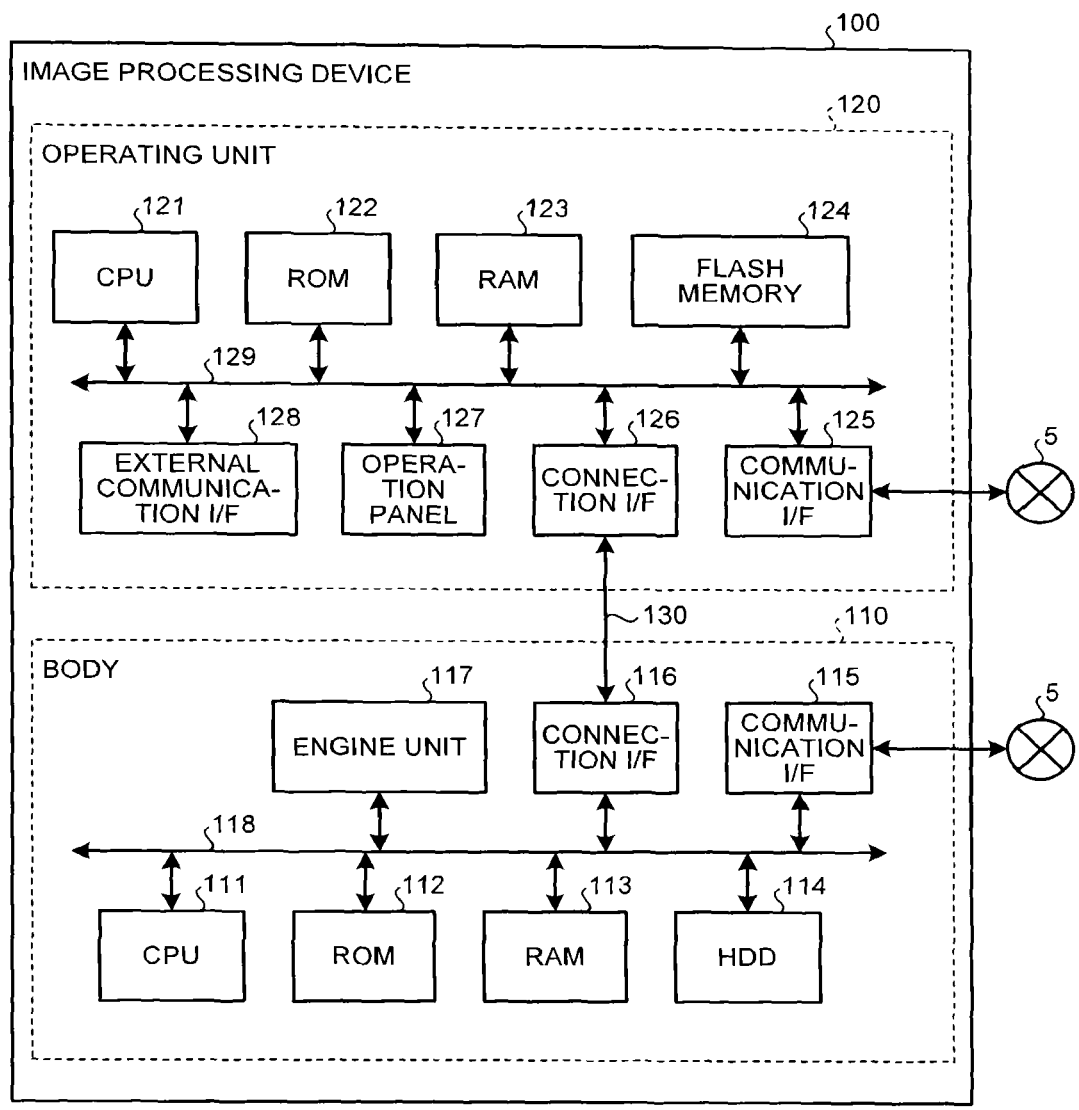
FIG. 4 is a diagram illustrating a hardware configuration example of the image processing apparatus according to the first embodiment.

A hardware configuration of the image processing apparatus 100 according to the first embodiment will be explained next with reference to FIG. 4. FIG. 4 is a diagram illustrating a hardware configuration example of the image processing apparatus 100 according to the first embodiment.

As illustrated in FIG. 4, the image processing apparatus 100 includes a body 110 that can implement various functions such as a copy function, a scanner function, a facsimile function, and a printer function, and an operating unit 120 that receives a user operation. Receiving a user operation mentioned here is a concept including reception of information (that includes a signal or the like indicating a coordinate value of a screen) input according to the user operation. The body 110 and the operating unit 120 are communicably connected to each other via a dedicated communication path 130. As the communication path 130, those of the Universal Serial Bus (USB) standard can be used, or those of any standard may be used regardless of wired or wireless.

The body 110 can operate according to an operation received by the operating unit 120. The body 110 can communicate with an external device such as a client personal computer (PC), and can also operate according to an instruction received from the external device.

First of all, a hardware configuration of the body 110 will be explained below. As illustrated in FIG. 4, the body 110 includes a CPU 111, a ROM 112, a RAM 113, a HDD 114, a communication I/F 115, a connection I/F 116, and an engine unit 117, which are connected to each other via a system bus 118.

The CPU 111 integrally controls operations of the body 110. The CPU 111 executes a program stored in the ROM 112 or the HDD 114 using the RAM 113 as a work area, so that the operations of the entire body 110 are controlled to implement various functions such as the copy function, the scanner function, the facsimile function, and the printer function.

The communication I/F 115 is an interface used to connect to a network 5. The connection I/F 116 is an interface used to perform communication with the operating unit 120 via the communication path 130. The engine unit 117 is hardware that performs processing, other than versatile information processing and communication, which is used to implement the copy function, the scanner function, the facsimile function, and the printer function.

For example, the engine unit 117 includes a scanner (image reading unit) that scans and reads an image of a document, a plotter (image forming unit) that prints the image to a sheet material such as a paper sheet, and a facsimile unit that performs fax communication. The engine unit 117 can further include a specific option such as a finisher that sorts out printed sheet materials and an automatic document feeder (ADF) that automatically feeds a document.

Then, a hardware configuration of the operating unit 120 will be explained below. As illustrated in FIG. 4, the operating unit 120 includes a CPU 121, a ROM 122, a RAM 123, a flash memory 124, a communication I/F 125, a connection I/F 126, an operation panel 127, and an external communication I/F 128, which are connected to each other via a system bus 129.

The CPU 121 integrally controls operations of the operating unit 120. The CPU 121 executes a program stored in the ROM 122 or the flash memory 124 using the RAM 123 as a work area, so that the operations of the entire operating unit 120 are controlled to implement various functions, which are explained later, such as display of information (image) according to an input received from the user.

The communication I/F 125 is an interface used to connect to the network 5. The connection I/F 126 is an interface used to perform communication with the body 110 via the communication path 130. The operation panel 127 receives various inputs according to a user operation and displays various pieces of information (e.g., information according to the received operation, information indicating operating conditions of the image processing apparatus 100, or information indicating a setting state etc.). In this example, the operation panel 127 is configured by a liquid crystal display (LCD) that includes a touch panel function; however, the embodiment is not limited thereto. For example, the operation panel 127 may be configured by an organic electroluminescence (OEL) display device that includes a touch panel function. The operation panel 127 can further include an operating unit such as a hardware key and a display unit such as a lamp in addition to or instead of the OEL display device.

In other words, in the present embodiment, the image processing apparatus 100 includes a control unit (e.g., CPU 111) in the body of the image processing apparatus 100 and a control unit (e.g., CPU 121) independent from the body of the image processing apparatus 100, and the operation panel 127 is controlled by the control unit (e.g., CPU 121) independent from the body of the image processing apparatus 100.

Software Configuration

Figure 5:
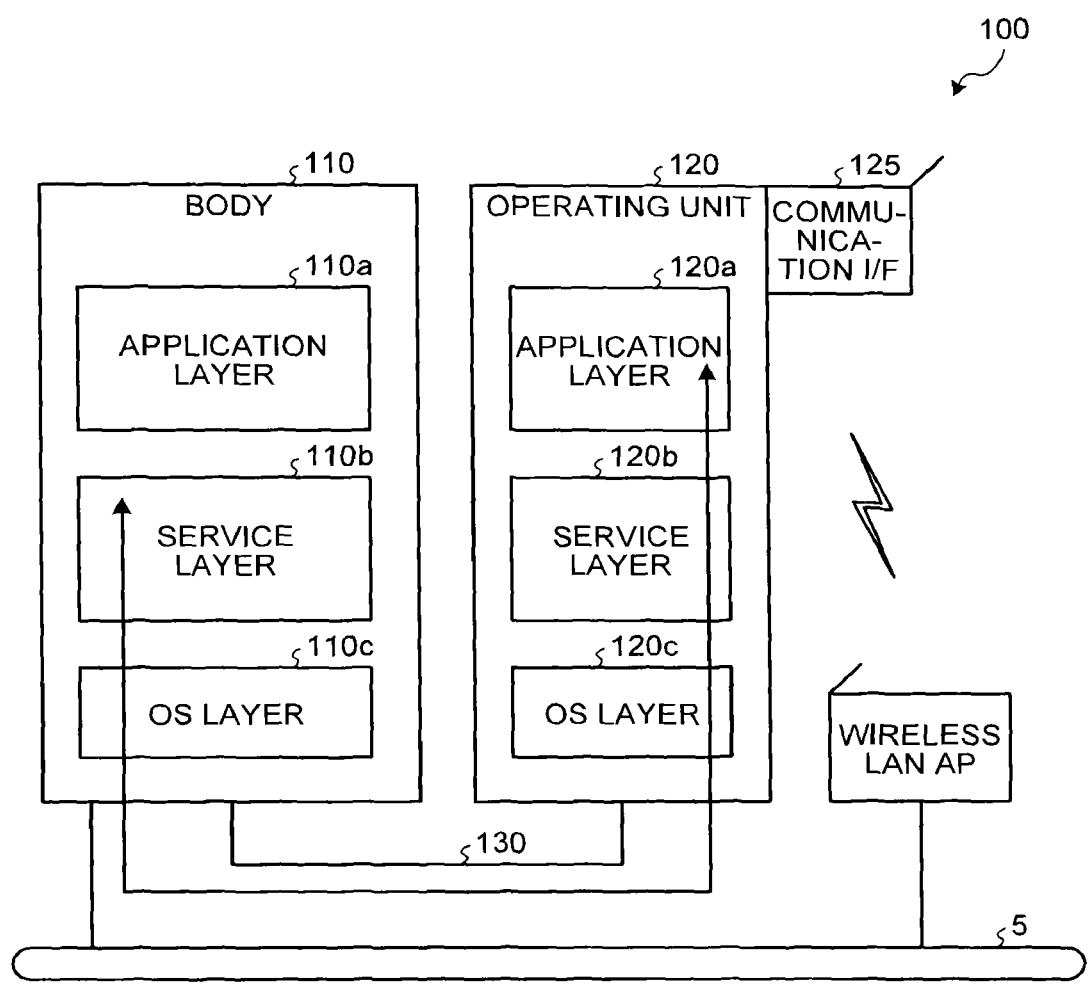
FIG. 5 is a pattern diagram illustrating a software configuration example of the image processing apparatus according to the first embodiment.

A software configuration of the image processing apparatus 100 according to the first embodiment will be explained next with reference to FIG. 5. FIG. 5 is a pattern diagram illustrating a software configuration example of the image processing apparatus 100 according to the first embodiment.

As illustrated in FIG. 5, the body 110 includes an application layer 110a, a service layer 110b, and an operating system (OS) layer 110c. Substances of the application layer 110a, the service layer 110b, and the OS layer 110c are various pieces of software stored in the ROM 112 or the HDD 114. The CPU 111 executes these pieces of software, and various functions are thereby provided.

The software of the application layer 110a is application software (hereinafter, sometimes called "App") for operating hardware resources to provide a predetermined function. For example, the App includes a copying App for providing a copy function, a scanner App for providing a scanner function, a facsimile App for providing a facsimile function, and a printer App for providing a printer function.

The software of the service layer 110b is provided between the application layer 110a and the OS layer 110c and is used to provide an interface, for Apps, for using the hardware resources provided in the body 110. More specifically, the software of the service layer 110b is used to provide functions of receiving an operation request for the hardware resources and arbitrating operation requests. The operation request received by the service layer 110b can be a request to read data by a scanner or to print data by a plotter.

The interface function performed by the service layer 110b is provided not only to the application layer 110a of the body 110 but also to an application layer 120a of the operating unit 120. In other words, the application layer 120a (App) of the operating unit 120 can also implement a function using hardware resources (e.g., engine unit 117) of the body 110 via the interface function of the service layer 110b.

The software of the OS layer 110c is basic software (operating system) for providing a basic function for controlling the hardware provided in the body 110. The software of the service layer 110b converts a use request of the hardware resources from any of various Apps into a command that can be interpreted by the OS layer 110c, and transmits the command to the OS layer 110c. The software of the OS layer 110c executes the command, so that the hardware resources operate according to the request of the App.

The operating unit 120 includes the application layer 120a, a service layer 120b, and an OS layer 120c. A hierarchical structure of the application layer 120a, the service layer 120b, and the OS layer 120c is the same as that of the body 110. However, functions provided by Apps of the application layer 120a and types of operation request that the service layer 120b can receive are different from these of the body 110. The App of the application layer 120a may be software used to operate the hardware resources provided in the operating unit 120 to provide a predetermined function; however, the App is software used to provide mainly user interface (UI) functions for performing an operation and a display of functions (copy function, scanner function, facsimile function, and printer function) provided in the body 110.

In the present embodiment, the software of the OS layer 110c in the body 110 is different from the software of the OS layer 120c in the operating unit 120 in order to maintain independence of the functions. In other words, the body 110 and the operating unit 120 operate independently of each other on separate operating systems. For example, Linux (trademark) can be used as the software of the OS layer 110c in the body 110, and Android (trademark) can be used as the software of the OS layer 120c in the operating unit 120.

As explained above, in the image processing apparatus 100 according to the present embodiment, the body 110 and the operating unit 120 operate on separate operating systems, and therefore, a communication between the body 110 and the operating unit 120 is performed as a communication between different devices not as a communication between processes within a common device. The communication between the body 110 and the operating unit 120 corresponds to an operation (command communication) for transmitting information (contents instructed from the user) received by the operating unit 120 to the body 110 or to an operation that the body 110 notifies the operating unit 120 of an event. Herein, the operating unit 120 performs command communication to the body 110, so that the function of the body 110 can be used. The event notified from the body 110 to the operating unit 120 includes an execution status of the operation in the body 110, a content set by the body 110, and the like.

In the present embodiment, because power is supplied to the operating unit 120 from the body 110 via the communication path 130, the control of a power supply in the operating unit 120 can be provided separately (independently) from the control of a power supply in the body 110.

Device Configuration According to First Embodiment

Figure 6:
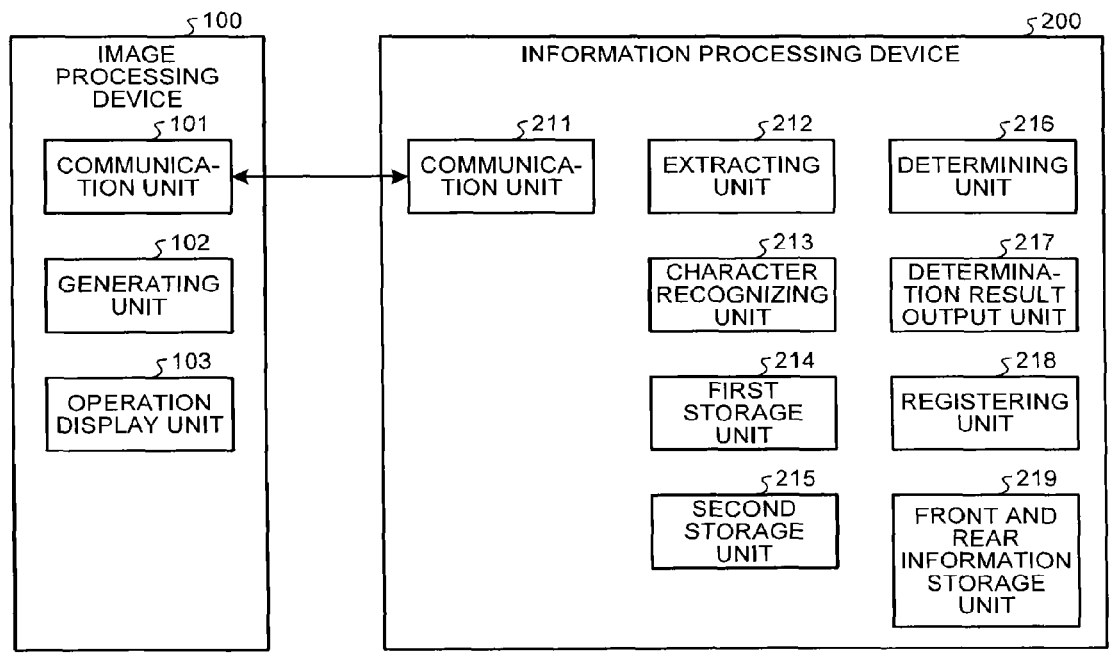
FIG. 6 is a functional block diagram illustrating configuration examples of the image processing apparatus and the information processing apparatus according to the first embodiment.

Configurations of the image processing apparatus 100 and the information processing apparatus 200 will be explained next with respect to FIG. 6. FIG. 6 is a functional block diagram illustrating configuration examples of the image processing apparatus 100 and the information processing apparatus 200 according to the first embodiment. In the following explanation, "business card" is used as an example of a document.

As illustrated in FIG. 6, the image processing apparatus 100 includes a communication unit 101, a generating unit 102, and an operation display unit 103. The communication unit 101 performs communication with the information processing apparatus 200 via the network. For example, the communication unit 101 transmits a scanned image or a replacement result to the information processing apparatus 200, or receives pieces of information on one side and the other side of a document from the information processing apparatus 200. The replacement result will be explained later.

The generating unit 102 reads a plurality of documents and generates a scanned image including a plurality of business card images. More specifically, the generating unit 102 uses the scanner function of the image processing apparatus 100 to read a plurality of business cards or the like at a time and generate a scanned image including a plurality of business card images. The generating unit 102 transmits the generated scanned image to the information processing apparatus 200 via the communication unit 101. Scanning business cards or the like is performed on one side (e.g., front face) of the business cards and then on the other side (e.g., rear face) thereof after the user turns them over. With these operations, scanned images for both sides of the business cards are generated, and the generated scanned images are transmitted to the information processing apparatus 200.

The operation display unit 103 displays various pieces of information and receives various inputs by user operation. For example, the operation display unit 103 is a touch panel. More specifically, the operation display unit 103 displays the pieces of information on one side and the other side of a business card or the like received by the communication unit 101. If there is any information in which a correspondence between one side and the other side thereof is incorrect, the user performs an operation of replacing the pieces of information so as to obtain a correct correspondence, based on the displayed information on one side and the other side thereof. If a correspondence between one side and the other side thereof is correct, the user performs an operation of inputting confirmation of the correspondence. Thereby the operation display unit 103 receives the replacement result as pieces of information in which one side and the other side are replaced, or receives the input of the confirmation of the correspondence. The operation display unit 103 then transmits the replacement result or the confirmation thereof to the information processing apparatus 200 via the communication unit 101.

The information processing apparatus 200 includes a communication unit 211, an extracting unit 212, a character recognizing unit 213, a first storage unit 214, a second storage unit 215, a determining unit 216, a determination result output unit 217, a registering unit 218, and a front and rear information storage unit 219. Part or whole of the units may be software (program) or may be a hardware circuit.

The communication unit 211 performs communication with the image processing apparatus 100 via the network. For example, the communication unit 211 receives the scanned image including the business card images or the replacement result from the image processing apparatus 100, or transmits pieces of information on one side and the other side of a business card to the image processing apparatus 100.

The extracting unit 212 extracts each of the business card images included in the scanned image. More specifically, the extracting unit 212 receives a scanned image received by the communication unit 211 and including the business card images generated by the image processing apparatus 100. The extracting unit 212 then extracts each of the business card images included in the scanned image. Respective business card images are extracted based on respective positions of the business card images where the business cards are scanned by the image processing apparatus 100.

The character recognizing unit 213 performs character recognition processing. More specifically, the character recognizing unit 213 uses the OCR function to perform OCR processing on each of the business card images extracted by the extracting unit 212. The character recognizing unit 213 stores processing results of the OCR processing in the first storage unit 214 and the second storage unit 215. Specifically, the character recognizing unit 213 stores a processing result of the OCR processing performed on one side of the business card images in the first storage unit 214, and stores a processing result of the OCR processing performed on the other side of the business card images in the second storage unit 215. In other words, the first storage unit 214 stores the processing result of the OCR processing performed on one side of the business card images. The second storage unit 215 stores the processing result of the OCR processing performed on the other side of the business card images.

The determining unit 216 determines whether or not elements included in an array on the one side and in an array on the other side of each of the business card images have a pair relationship. The array represents, for example, a character or a set of characters included in a business card image or any information included in the business card image. The element represents, for example, information having some meanings such as name, company name, address, logotype, picture, and sign. The element is one example of first information which is any one of a plurality of recognition results obtained by performing the character recognition processing on one side of document images. The element is also one example of second information which is any one of a plurality of recognition results obtained by performing the character recognition processing on the other side of the document images.

More specifically, the determining unit 216 acquires a processing result of the OCR processing that the character recognizing unit 213 performs on one side of the business card images from the first storage unit 214. The determining unit 216 also acquires a processing result of the OCR processing that the character recognizing unit 213 performs on the other side of the business card images from the second storage unit 215. The determining unit 216 then determines whether or not the elements such as a name and a company name included in the one side and the other side of respective business card images have the pair relationship based on the acquired processing results.

In the determination, as one aspect, the image processing apparatus 100 determines whether or not the elements have the pair relationship based on a relative position when one side of the business cards is scanned and a relative position when the other side of the business cards is scanned. More specifically, if the relative position when the one side is scanned and the relative position when the other side is scanned are within a predetermined distance, then the determining unit 216 determines that the corresponding elements on one side and the other side have the pair relationship. For example, if a leftmost-uppermost position of the business cards when the one side thereof is scanned and a leftmost-uppermost position of the business cards when the other side thereof is scanned substantially coincide with each other, the coincidence indicates one business card, and therefore it is determined that the elements on the one side and the other side have the pair relationship. When the user uses the image processing apparatus 100 to scan business cards, one side thereof is first scanned and then the other side thereof is scanned after the business cards are tuned over without replacing the positions of the business cards. Therefore, when the relative position on the one side and the relative position on the other side at the time of scanning are within a predetermined distance (the positions substantially coincide with each other), the determining unit 216 determines that the corresponding elements on one side and the other side have the pair relationship.

The determination result output unit 217 outputs determination results representing pieces of information on one side and on the other side as information for one business card. More specifically, when the determining unit 216 determines that the elements have the pair relationship, the determination result output unit 217 transmits each of determination results that represent pieces of information for recognition results on one side and on the other side as information for one business card to the image processing apparatus 100 via the communication unit 211. Thus, the operation display unit 103 of the image processing apparatus 100 displays the determination results. If there is any information in which correspondence between one side and the other side is incorrect, then the user replaces the positions so that the correspondence becomes correct. The replacement result is transmitted to the information processing apparatus 200.

The registering unit 218 registers the pieces of information on one side and on the other side as information for one business card in the front and rear information storage unit 219. The registration processing performed by the registering unit 218 is executed when the determining unit 216 determines that the elements have the pair relationship or when the replacement result is received after the determination result output unit 217 outputs the determination results. More specifically, when the determining unit 216 determines that the elements have the pair relationship, the registering unit 218 registers the pieces of information for recognition results corresponding to one side and to the other side including the elements determined that they have the pair relationship, as information for one business card, in the front and rear information storage unit 219. Alternatively, when receiving the replacement result from the image processing apparatus 100 via the communication unit 211, the registering unit 218 registers the pieces of information on one side and on the other side, as information for one business card, in the front and rear information storage unit 219 according to the replacement result. When receiving the information to the effect that the determination results are confirmed from the image processing apparatus 100 via the communication unit 211, the registering unit 218 executes the processing of registering the information in the front and rear information storage unit 219 according to the original determination results.

The front and rear information storage unit 219 stores the determination results or the replacement result as information for one business card. The front and rear information is information in which elements included in one side (e.g., front face) and the other side (e.g., rear face) of a document such as a business card are associated with each other. The front and rear information storage unit 219 is not necessarily included in the information processing apparatus 200. For example, the front and rear information may be registered in a storage device (server device) connected to the information processing apparatus 200.

Overall Processing Sequence According to First Embodiment

Figure 7:
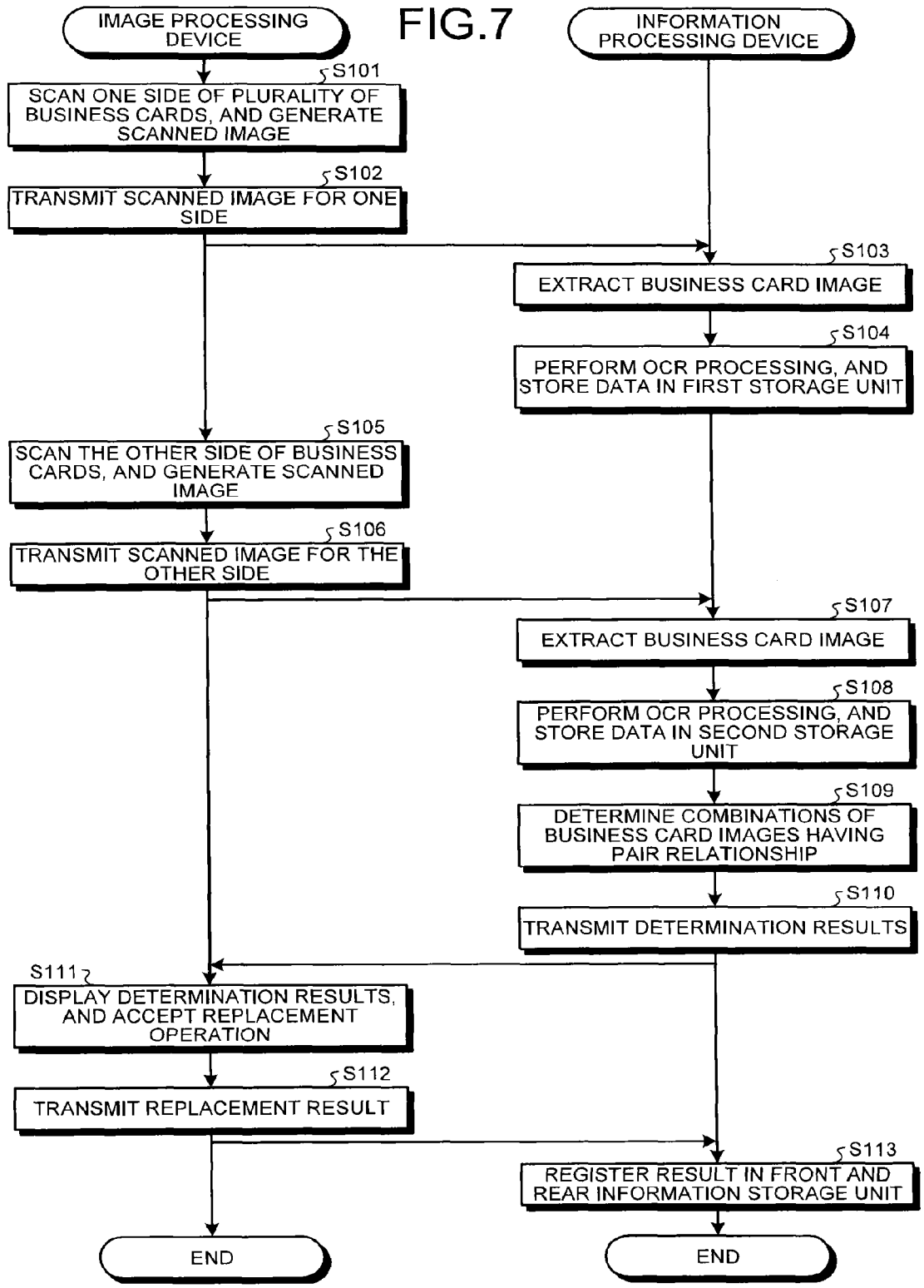
FIG. 7 is a sequence diagram illustrating an example of an overall processing flow performed by the image processing apparatus and the information processing apparatus according to the first embodiment.

An overall processing flow performed by the image processing apparatus 100 and the information processing apparatus 200 according to the first embodiment will be explained next with reference to FIG. 7. FIG. 7 is a sequence diagram illustrating an example of an overall processing flow performed by the image processing apparatus 100 and the information processing apparatus 200 according to the first embodiment.

As illustrated in FIG. 7, the image processing apparatus 100 scans one side of a plurality of business cards to generate a scanned image including a plurality of business card images (Step S101). The image processing apparatus 100 then transmits the generated scanned image for the one side to the information processing apparatus 200 (Step S102). The information processing apparatus 200 receives the scanned image for the one side transmitted by the image processing apparatus 100 and extracts the respective business card images included in the scanned image (Step S103). The information processing apparatus 200 performs the OCR processing on each of the extracted business card images, and stores the processing results of the OCR processing in the first storage unit 214 (Step S104).

The image processing apparatus 100 also scans the other side of the business cards to generate a scanned image including a plurality of business card images (Step S105). The image processing apparatus 100 then transmits the generated scanned image for the other side to the information processing apparatus 200 (Step S106). The information processing apparatus 200 receives the scanned image for the other side transmitted by the image processing apparatus 100 and extracts the respective business card images included in the scanned image (Step S107). The information processing apparatus 200 then performs the OCR processing on each of the extracted business card images, and stores the processing results of the OCR processing in the second storage unit 215 (Step S108).

Subsequently, the information processing apparatus 200 determines combinations in which the elements have the pair relationship based on the processing results of the OCR processing performed on the one side and the other side stored in the first storage unit 214 and the second storage unit 215 (Step S109). Thereafter, the information processing apparatus 200 transmits determination results to the image processing apparatus 100 (Step S110). The image processing apparatus 100 having received the determination results displays the determination results, and accepts a replacement operation by the user (Step S111). The image processing apparatus 100 then transmits a replacement result to the information processing apparatus 200 (Step S112). The information processing apparatus 200 receives the replacement result transmitted from the image processing apparatus 100, and registers the received replacement result as information for each of the business cards in the front and rear information storage unit 219 (Step S113).

Determination Processing Flow According to First Embodiment

Figure 8:
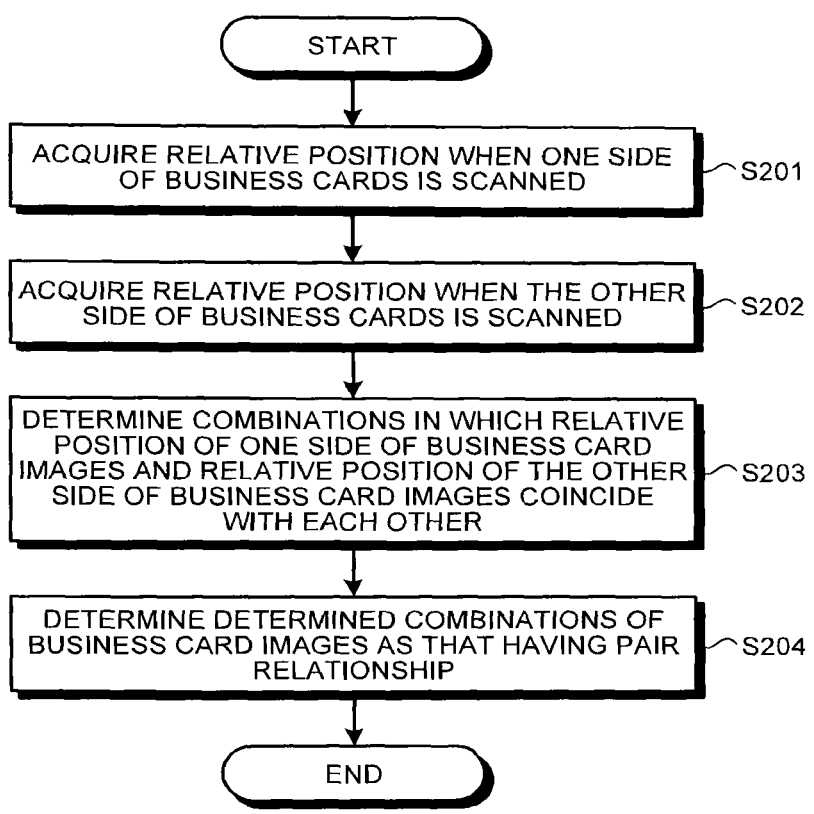
FIG. 8 is a flowchart illustrating an example of a determination processing flow according to the first embodiment.

A determination processing flow according to the first embodiment will be explained next with respect to FIG. 8. FIG. 8 is a flowchart illustrating an example of a determination processing flow according to the first embodiment. The determination processing indicates mainly processing performed by the determining unit 216, and indicates detailed processing at Step S109 illustrated in FIG. 7.

As illustrated in FIG. 8, the determining unit 216 acquires a relative position when the image processing apparatus 100 scans one side of the business cards (Step S201). The determining unit 216 also acquires a relative position when the image processing apparatus 100 scans the other side of the business cards (Step S202). The determining unit 216 then determines combinations in which a relative position of one side of business card images and a relative position of the other side of business card images coincide with each other (Step S203). The determining unit 216 determines that the elements included in the one side and the other side have the pair relationship, from the determined combinations of the business card images (Step S204).

Effects Due to First Embodiment

The image processing system 1 scans one side of a plurality of business cards which are randomly arranged and scans the other side thereof after the business cards are turned over at the respective positions. The image processing system 1 determines whether or not corresponding elements included in one side and the other side have the pair relationship based on the relative positions when one side and the other side including the business card images are scanned. Thereafter, the image processing system 1 registers the pieces of information on the one side and on the other side in which the elements have the pair relationship in the storage unit. As a result of these operations, when the front face and the rear face of business cards are to be scanned and the pieces of information for the front face and the rear face are to be compiled into a database, the image processing system 1 does not require the user to put the business cards in a transparent sheet, thus improving user friendliness.

Modification 1 of First Embodiment

In the first embodiment, the case is explained in which, by determining combinations of the business card images in which relative positions obtained by scanning one side of business card images and the other side of business card images coincide with each other, it is determined that the elements included in the one side and the other side have the pair relationship. Whether or not the elements included in the one side and the other side have the pair relationship may be determined based on an indication element (display information) such as a logotype. For example, the determining unit 216 determines whether or not similar indication elements are included in the one side and the other side. When similar indication elements are included in the one side and the other side, then the determining unit 216 determines that the elements included in the one side and the other side have the pair relationship. The indication element may be a picture, some symbol, or the like in addition to the logotype.

Determination Processing Flow According to Modification 1 of First Embodiment

Figure 9:
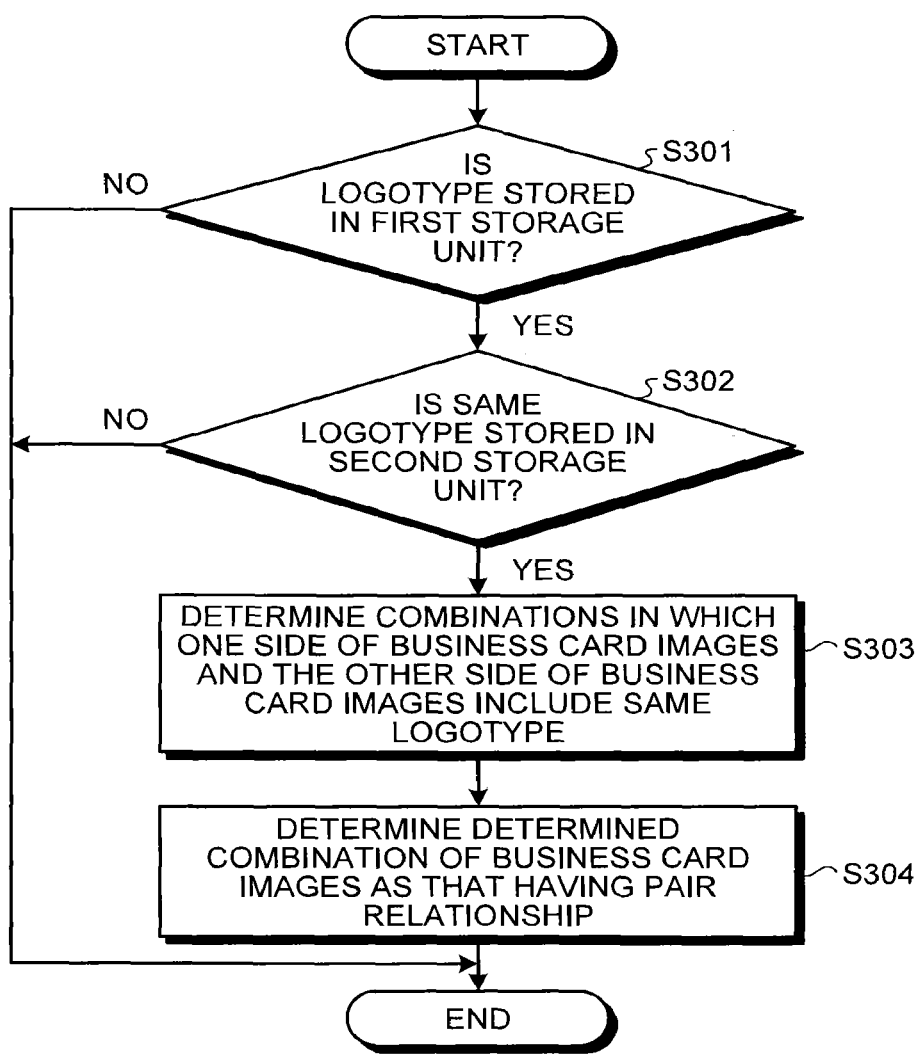
FIG. 9 is a flowchart illustrating an example of a determination processing flow according to a modification 1 of the first embodiment.

A determination processing flow according to the modification 1 of the first embodiment will be explained below with respect to FIG. 9. FIG. 9 is a flowchart illustrating an example of the determination processing flow according to the modification 1 of the first embodiment.

As illustrated in FIG. 9, the determining unit 216 refers to the first storage unit 214 to determine whether or not any logotype is stored therein (Step S301). When it is determined that the logotype is stored in the first storage unit 214 (Yes at Step S301), then the determining unit 216 refers to the second storage unit 215 to determine whether or not any logotype is stored therein (Step S302). When it is determined that the logotype is stored in the second storage unit 215 (Yes at Step S302), then the determining unit 216 determines combinations in which one side of business card images and the other side of business card images include the same logotype (Step S303). Subsequently, the determining unit 216 determines that the elements included in the one side and the other side have the pair relationship, from the determined combination of the business card images (Step S304). When no logotype is stored in the first storage unit 214 (No at Step S301) and when no logotype is stored in the second storage unit 215 (No at Step S302), then the determining unit 216 ends the processing.

Effects Due to Modification 1 of First Embodiment

When a logotype or the like of a company is printed on one side and the other side of a business card and if similar logotypes are included in the one side and the other side, then the image processing system 1 determines that the elements included in the one side and the other side have the pair relationship. Consequently, for example, when a business card has the same contents of the front face and rear face but has different languages, then the image processing system 1 can appropriately associate respective pieces of information for the front faces and the rear faces of the business cards with each other.

Modification 2 of First Embodiment

In the first embodiment, the case is explained in which, by determining the combinations of the business card images in which relative positions obtained by scanning one side and the other side coincide with each other, it is determined that the elements included in the one side and the other side have the pair relationship. Whether or not the elements included in the one side and the other side have the pair relationship may be determined based on a font type. For example, the determining unit 216 determines whether or not characters written in the same font type are included in the one side and the other side. When characters written in the same font type are included in the one side and the other side, then the determining unit 216 determines that the elements included in the one side and the other side have the pair relationship.

Determination Processing Flow According to Modification 2 of First Embodiment

Figure 10:
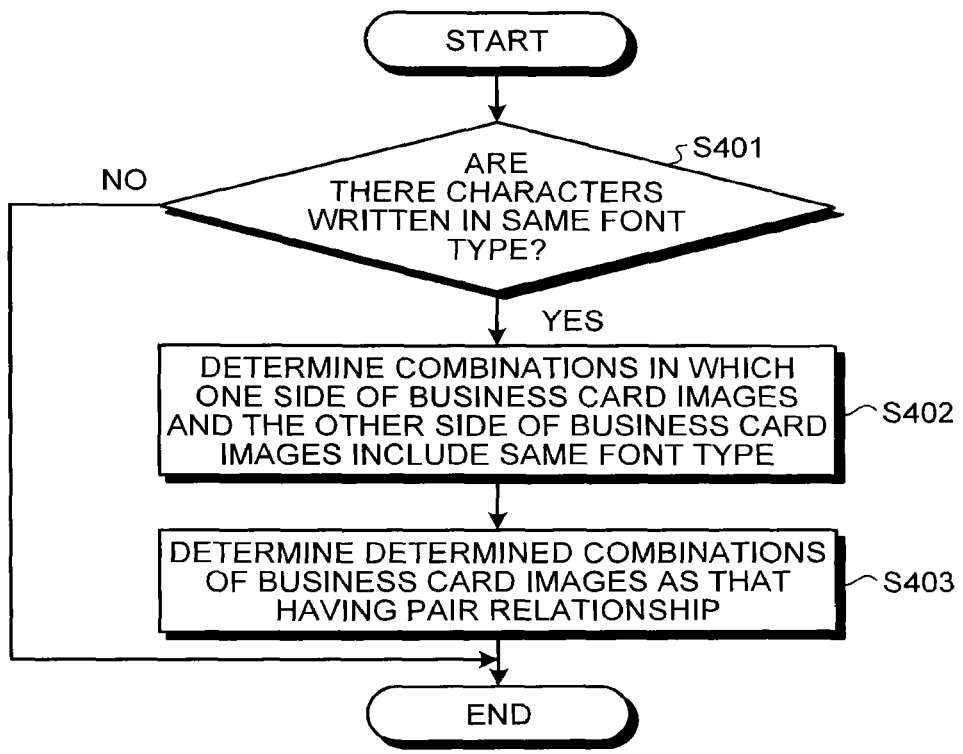
FIG. 10 is a flowchart illustrating an example of a determination processing flow according to a modification 2 of the first embodiment.

A determination processing flow according to the modification 2 of the first embodiment will be explained below with respect to FIG. 10. FIG. 10 is a flowchart illustrating an example of the determination processing flow according to the modification 2 of the first embodiment.

As illustrated in FIG. 10, the determining unit 216 refers to the first storage unit 214 and the second storage unit 215 to determine whether or not characters written in the same font type are included in the one side and the other side (Step S401). When it is determined that the one side and the other side include characters written in the same font type (Yes at Step S401), the determining unit 216 determines combinations in which the one side of business card images and the other side of business card images include the same font type (Step S402). The determining unit 216 then determines that the elements included in the one side and the other side have the pair relationship, from the determined combinations of the business card images (Step S403). In the determination of combinations, when a proportion in which the one side and the other side have the same font type is a predetermined ratio or higher, it may be determined that the elements included in the one side and the other side have the pair relationship.

Effects Due to Modification 2 of First Embodiment

When the font type of characters included in one side and the other side of a business card is the same as each other, the image processing system 1 determines that the elements included in the one side and the other side have the pair relationship. Consequently, for example, when personal information is printed on one side of a business card and business activities and business hours of a company are also printed on the other side of the business card, the image processing system 1 can appropriately associate respective pieces of information for the front faces and the rear faces of the business cards with each other.

Modification 3 of First Embodiment

In the first embodiment, the case is explained in which, by determining the combinations of the business card images in which relative positions obtained by scanning one side and the other side coincide with each other, it is determined that the elements included in the one side and the other side have the pair relationship. Whether or not the elements included in the one side and the other side have the pair relationship may be determined based on the same element. For example, the determining unit 216 determines whether or not the same element is included in the one side and the other side. When the same element is included in the one side and the other side, the determining unit 216 determines that the elements included in the one side and the other side have the pair relationship. Examples determined as the same element include a name, a company name, and an address.

Figure 11:
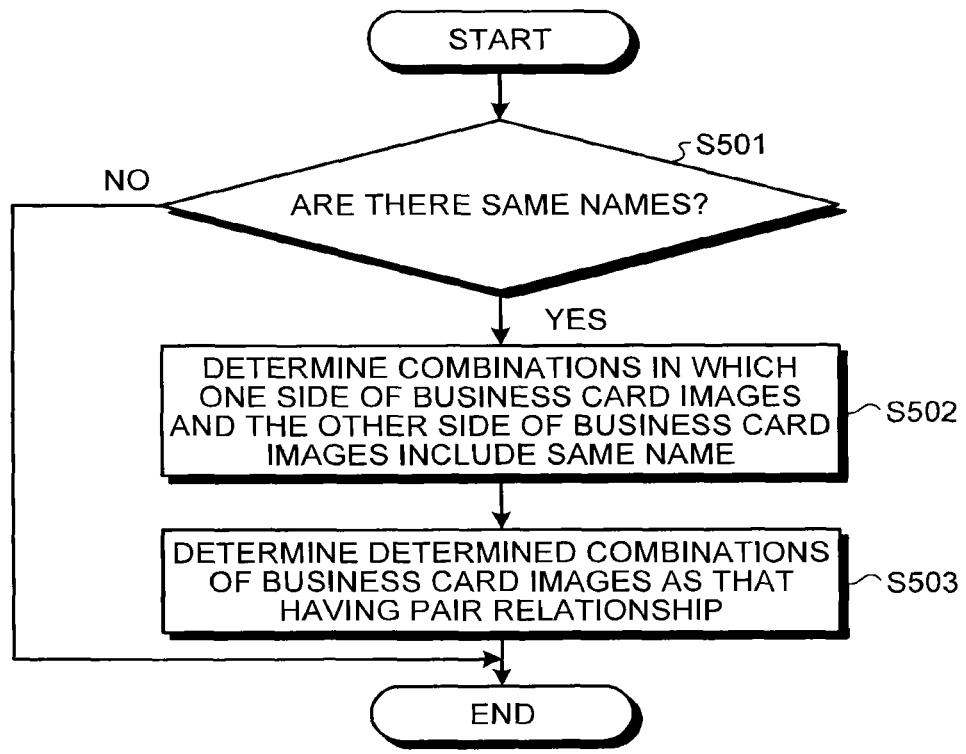
FIG. 11 is a flowchart illustrating an example of a determination processing flow according to a modification 3 of the first embodiment.

Determination Processing Flow According to Modification 3 of First Embodiment A determination processing flow according to the modification 3 of the first embodiment will be explained below with respect to FIG. 11. FIG. 11 is a flowchart illustrating an example of the determination processing flow according to the modification 3 of the first embodiment.

As illustrated in FIG. 11, the determining unit 216 refers to the first storage unit 214 and the second storage unit 215 to determine whether or not the same name is included in the one side and the other side (Step S501). When it is determined that the same name is included therein (Yes at Step S501), the determining unit 216 determines combinations in which the one side of business card images and the other side of business card images include the same name (Step S502). The determining unit 216 then determines that the elements included in the one side and the other side have the pair relationship, from the determined combination of the business card images (Step S503). The name and the like included in the one side and the other side may be a combination of different languages such as kanji, katakana, hiragana, or alphabetical notation. In other words, even if the languages on the one side and the other side are different from each other, it is determined whether the languages are the same as each other based on a language dictionary or the like. As for determination of elements such as a name and an address, by using a name dictionary, an address dictionary, or the like, or by recognizing positions (e.g., arrangement order or character string delimiter) on the business card, it is simply determined that the elements are the same as each other.

Effects Due to Modification 3 of First Embodiment

When the elements included in one side and the other side of a business card is the same as each other, the image processing system 1 determines that the elements included in the one side and the other side have the pair relationship. Consequently, for example, when the one side of the business card is printed in Japanese and the other side thereof is printed in English, the image processing system 1 can appropriately associate respective pieces of information for the front faces and the rear faces of business cards with each other.

Second Embodiment

The embodiment of the information processing apparatus according to the present invention has been explained so far; however, the present invention may be implemented in any of various embodiments other than the embodiment. Therefore, 1. configuration and 2. program of a different embodiment will be explained below.

1. Configuration

The information including the processing procedures, control procedures, specific names, and various data and parameters indicated in the document and drawings can be arbitrarily changed unless otherwise specified. The components of the illustrated devices are functionally conceptual, and need not be physically configured as illustrated. In other words, a specific configuration of the devices which are integrated or distributed is not limited to the illustrated examples, and all or part of the devices can be functionally or physically integrated or distributed in arbitrary units according to various loads or various statuses of use.

The embodiment has explained the image processing system 1 in which the image processing apparatus 100 having the scanner function scans one side and the other side of a business card and the information processing apparatus 200 determines whether or not elements included in the one side and the other side have the pair relationship after the OCR processing is performed on the both sides. However, the configuration of the image processing system 1 is not limited thereto. For example, the functions executed by the information processing apparatus 200 may be implemented by a plurality of server devices. Alternatively, for example, the functions executed by the information processing apparatus 200 may be included in the image processing apparatus 100.

In other words, when the functions executed by the information processing apparatus 200 are included in the image processing apparatus 100, the configuration will be as follows. The image processing apparatus includes a generating unit, an extracting unit, a character recognizing unit, a determining unit, and a registering unit. The generating unit reads a plurality of documents and generates a read image including a plurality of document images. The extracting unit extracts each of the document images included in the generated read image. The character recognizing unit performs character recognition processing on each of the extracted document images. The determining unit determines whether or not first information and second information have a pair relationship, the first information being any one of a plurality of recognition results obtained by performing the character recognition processing on one side of the document images and the second information being any one of a plurality of recognition results obtained by performing the character recognition processing on the other side of the document images. The registering unit registers the pieces of Information for the recognition results corresponding to the one side and to the other side respectively including the first information and the second information which are determined that both pieces of information have the pair relationship, as information for one document, in a storage unit. In other words, the image processing apparatus is an example of the image processing system 1.

2. Program

The program to be executed by the information processing apparatus 200 is provided, as one aspect, by being recorded in a computer-readable recording medium such as a compact disk read only memory (CD-ROM), a flexible disk (FD), a compact disk recordable (CD-R), and a digital versatile disc (DVD) as a file in an installable format or in an executable format. It may be configured so that the program executed by the information processing apparatus 200 is provided by being stored on a computer connected to a network such as the Internet and being downloaded via the network. It may also be configured so that the program executed by the information processing apparatus 200 is provided or distributed via a network such as the Internet. Moreover, it may be configured so that the program executed by the information processing apparatus 200 is provided by being preinstalled into ROM or the like.

The program executed by the information processing apparatus 200 is configured with modules including the units (extracting unit 212, character recognizing unit 213, determining unit 216, determination result output unit 217, and registering unit 218). As actual hardware, the CPU (processor) reads the program from the recording medium and executes the read program, and the units are thereby loaded to a main storage device. Thus the extracting unit 212, the character recognizing unit 213, the determining unit 216, the determination result output unit 217, and the registering unit 218 are generated on the main storage device.

The functions of the units in the image processing apparatus 100 are implemented by causing the CPU (CPU 111 or CPU 121) to execute the program stored in the storage device (e.g., ROM 112, HDD 114, ROM 122, or flash memory 124). However, the embodiment is not thereto. For example, at least part of the functions of the units in the image processing apparatus 100 may be implemented by a dedicated hardware circuit (e.g., semiconductor integrated unit). In other words, the storage device may be implemented by, for example, the HDD 114 in the body 110, or may be implemented by the flash memory 124 or the like in the operating unit 120.

In the embodiments, the body 110 and the operating unit 120 operate independently of each other on separate operating systems; however, the embodiment is not limited thereto. For example, it may be configured so that the body 110 and the operating unit 120 operate on the same operating system. It may also be configured so that the program executed by the image processing apparatus 100 according to the embodiments is provided by being recorded in a computer-readable recording medium such as CD-ROM, FD, CD-R, DVD, and Universal Serial Bus (USB) memory as a file in an installable format or in an executable format. Moreover, it may be configured so that various programs are provided by being preinstalled into a nonvolatile storage medium such as ROM.

According to one aspect of the present invention, it is possible to improve user convenience at the time of compiling documents such as business cards into a database.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system, comprising:
    an image processing apparatus including a scanner configured to
        read a first side of each of a plurality of documents and a second side of each of the plurality of documents after the plurality of documents are turned over so that positions of the plurality of documents when the second side faces up substantially coincide with positions of the plurality of documents when the first side faces up; and
        generate a first scanning image including first document images of the first side of the plurality of documents and a second scanned image including second document images of the second side of the plurality of documents; and
    a server including a memory and a processor, the processor configured to
        extract each of the first and second document images included in the first scanned image and the second scanned image; and
        register the first and second document images in the memory, wherein
    the first and second document images have a pair relationship based on relative positions of the first document images when the first side of each of the documents are read and the second document images when the second side of each of the documents are read.

2. The image processing system according to claim 1, wherein the document includes a business card.

3. The image processing system according to claim 1, wherein
    the image processing apparatus is external to the server.

4. The image processing system according to claim 1, wherein the processor determines whether similar information is included on one side of a first document as is included on the other side of the first document.

5. The image processing system according to claim 1, wherein the processor determines whether a character is written in a same font type included on one side of a first document as is included on the other side of the first document.

6. The image processing system according to claim 1, wherein the processor determines whether same information is included on one side of a first document as is included on the other side of the first document.

7. The image processing system according to claim 1, wherein the processor is further configured to
    output, for document images in which the determination results indicate that the first document images have the pair relationship with the second document, the document images as the information for a document, and
    register a replacement result in the memory so that previous information in the memory for the document is replaced with the information for the document.

8. An image processing apparatus, comprising:
    a scanner configured to generate a first image including first document images of a first side of a plurality of documents and a second image including second document images of a second side of the plurality of documents after the plurality of documents are turned over so that positions of the plurality of documents when the second side faces up substantially coincide with positions of the plurality of documents when the first side faces up; and
    a processor configured to
        transmit the first image and the second image to a server, and
        display determination results received from the server that indicate whether the first document images and the second document images have a pair relationship based on relative positions of the first document images when the first side of each of the documents are read and the second document images when the second side of each of the documents are read.

9. An image processing method, comprising:
generating a first image including first document images of a first side of a plurality of documents;
generating a second image including second document images of a second side of the plurality of documents after the plurality of documents are turned over so that positions of the plurality of documents when the second side faces up substantially coincide with positions of the plurality of documents when the first side faces up;
transmitting the first image and the second image to a server; and
displaying determination results received from the server that indicate whether the first document images and the second document images have a pair relationship based on relative positions of the first document images when the first side of each of the documents are read and the second document images when the second side of each of the documents are read.

10. The image processing system according to claim 1, wherein the positions of the plurality of documents, when the second side faces up, substantially coincide with the positions of the plurality of documents, when the first side faces up, after the plurality of documents are turned over without replacing relative positions of the plurality of documents.

* * * * *